Jan. 30, 1940.   F. S. ARMSTRONG   2,188,698
AUTOMOBILE JACK
Filed March 30, 1936   2 Sheets-Sheet 1

Frank S. Armstrong, INVENTOR
BY Victor J. Evans & Co.
ATTORNEY

Jan. 30, 1940.  F. S. ARMSTRONG  2,188,698
AUTOMOBILE JACK
Filed March 30, 1936   2 Sheets-Sheet 2
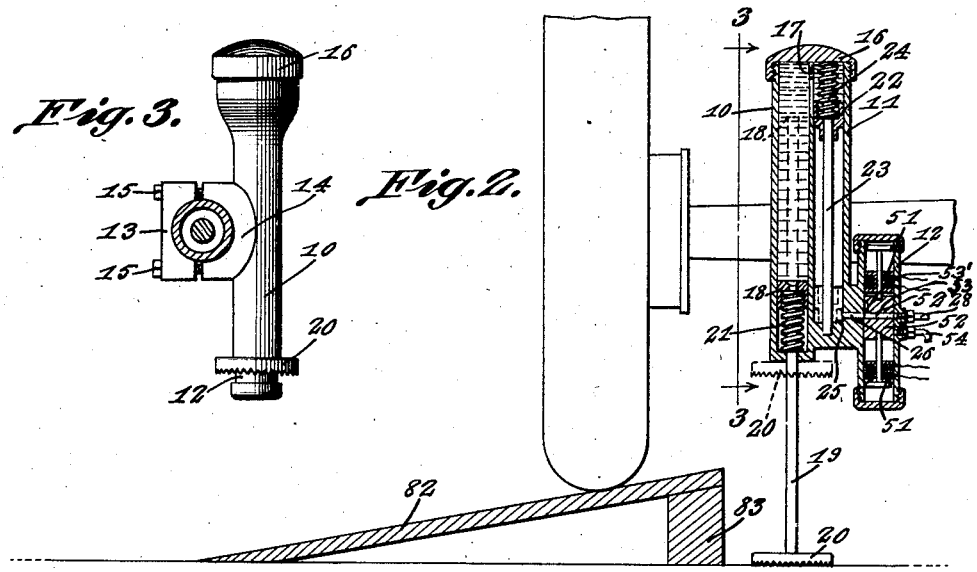
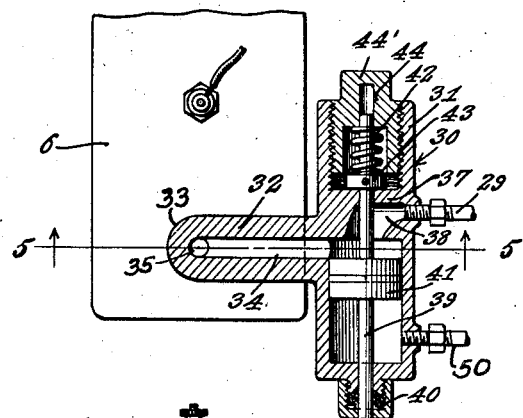
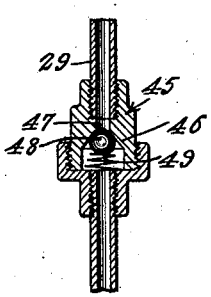
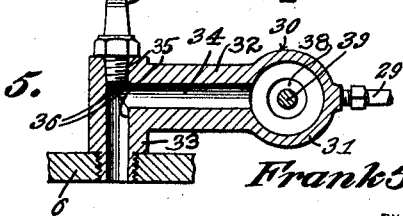
Frank S. Armstrong, INVENTOR
BY Victor J. Evans & Co.
ATTORNEY Patented Jan. 30, 1940

2,188,698

UNITED STATES PATENT OFFICE 2,188,698

AUTOMOBILE JACK

Frank S. Armstrong, Youngwood, Pa.

Application March 30, 1936, Serial No. 71,777

4 Claims. (Cl. 60—54.5)

My invention relates to improvements in pneumatic jacks for automobiles and the primary object of the invention is to equip an automobile with practical efficient mechanism for jacking up any or all wheels of the automobile as desired, utilizing the combustion products or the exhaust gas of the automobile engine, and to provide as part of said equipment, an improved form of jack proof against impairment, as regards operation, in freezing weather and embodying as an integral part thereof a quick acting electrically operated valve of simple construction for controlling operation of said jack.

Other objects more or less subordinate to the above are also comprehended by my invention, all of which will presently appear when the following description and claims are read with reference to the drawings accompanying and forming part of this specification.

In said drawings:

Figure 2 is a fragmentary view partly in rear elevation and partly in vertical section of a jack forming part of the invention, parts being drawn to an enlarged scale.

Figure 3 is a view in transverse section, partly in elevation, and taken on the line 3—3 of Figure 2, looking in the direction indicated by the arrows.

Figure 4 is a fragmentary view of a part of the engine and a valve associated therewith for controlling the flow of combustion products from the engine to a source of supply presently described.

Figure 5 is a view in transverse vertical section taken on the line 5—5 of Figure 4, looking in the direction indicated by the arrows, and Figure 6 is a view in horizontal section of a back pressure valve interposed in the line of connection between said control valve and said source of supply.

Figure 1:
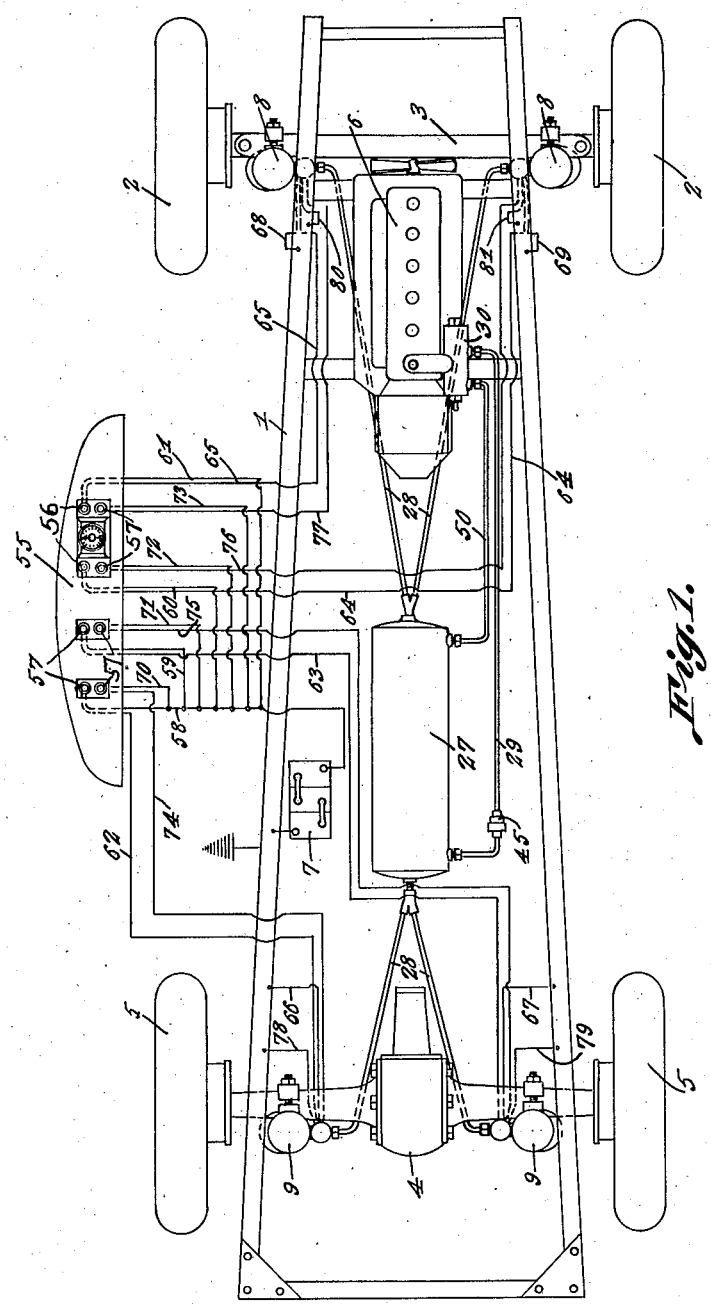
Figure 1 is a view, partly in top plan and partly diagrammatic, illustrating the application of my invention to an automobile.

Describing my invention in detail, with reference to the drawings, 1 designates the chassis frame of an automobile, equipped with front wheels 2, supported by a front axle 3, 4 the rear axle housing and 5 the rear wheels. The engine of the automobile is indicated conventionally at 6 and the usual battery at 7.

According to my invention the automobile is equipped with front and rear pairs of jacks 8 and 9, respectively, the front pair being mounted upon the front axles 3 and the rear pair on the axle housing 4, by means presently described.

Since the jacks of the respective pairs are identical in construction and operation, a description of one will suffice for all.

Each jack comprises a pair of parallel jack cylinders 10 and 11, respectively, disposed side by side and of substantially the same length and bore, and a third shorter valve cylinder 12 laterally offset from the bottom of the cylinder 11 parallel therewith. The three cylinders 10, 11 and 12, respectively, are preferably cast integrally with each other and are secured in upstanding position to the front axle 3, or the rear housing 4, as the case may be, near one end thereof, by a cap member 13 and a lateral boss 14 on said cylinders bolted together, as at 15, 15 and clamping the said axle or housing therebetween. The cylinders 10 and 11 are closed at their upper ends by a cap member 16 threaded thereon and communicate at said ends by means of an aperture 17. Within the cylinder 10 is a piston 18 fast upon the upper end of a piston rod 19 slidably mounted in the lower end of said cylinder and having secured to its lower end a disc-like serrated foot 20. A compression spring 21 interposed between the piston 18 and the lower end of said cylinder urges said piston and piston rod inwardly of the latter. Slidably mounted in the cylinder 11 is a similar piston 22 and also slidable upon a guide rod 23 upstanding from the bottom wall of the cylinder 11 axially thereof. A coiled compression spring 24 interposed between the piston 22 and the cap member 16 and surrounding said rod 23 urges the piston 22 downwardly. The piston 22 is formed with a depending reduced extension 35 which rests upon the bottom of the cylinder when the piston is urged downwardly under the influence of the spring 24, whereby an annular space 25 is formed between the bottom of the cylinder and the enlarged part of the piston. A radial port 26 is provided in the cylinder 11 and establishes communication between the space 25 of the cylinder 11 and the valve cylinder 12. The cylinder 10 is designed to contain a combined lubricant and anti-freeze solution preferably in the form of glycerin and alcohol, whereby the jack parts are proof against impairment in operation in freezing weather.

Suitably supported on the chassis intermediate the rear end and the engine 6 is a storage tank 27 for the combustion products of the engine 6. Opposite ends of the tank 27 are connected to the front and rear pairs of jacks 8 and 9, respectively, by means of pairs of pipe lines 28, one line of each pair being connected to one of said jacks, as shown in Figure 1. The combustion products of the engine are stored in the storage tank 27 by means of a pipe line 29 and a control valve 30 interposed between said line and the engine 6 alongside the latter.

The control valve 30 comprises a cylinder 31 formed intermediate its ends with a radial right angular extension 32 provided with a threaded nipple 33 whereby said valve is connected to the head of the engine 6 directly over the combustion chamber of one of the cylinders therein. The extension 32 has formed therein a right angled port 34 establishing communication between said combustion chamber and the cylinder 30. Preferably, the extension 32 is bored, as at 35, for mounting the spark plug associated with said chamber in said extension with the electrodes 36 of the plug projecting into the port 34. The cylinder 30 is formed on one side of the port 34 with a transverse partition 37 having a by-pass 38 therein, the by-pass 38 opening on to one side of the cylinder and having the front end of the pipe line 29 secured therein. A valve rod 39 is slidably mounted in one end of the cylinder and in a stuffing box 40 on said end for reciprocation axially of the cylinder. The valve rod 39 has fast thereon a valve piston 41 movable in one direction with said rod to close the by-pass 38 and in the opposite direction to open the same. A spring 42, interposed between a collar 43 fixed on said shaft 39 and a hollow plug 44, the latter threaded into the cylinder 31, tensions the rod 39 to move the piston 41 to opening position as determined by engagement of the collar 43 with the partition 37. Interposed in the pipe line 29 is a back pressure valve 45 in the form of a valve casing 46 having a port 47 therein adapted to be closed by a ball member 48 urged toward closing position by a spring 49. This form of back pressure valve is well known and therefore need not be further described.

A valve controlling pipe line 50 is connected to the valve cylinder 31, on the side of the piston 41 opposite to the by-pass 38, and also to the storage tank 27.

The products of combustion of the engine 6 are admitted to and exhausted from the cylinder 11 of each jack, by way of the port 26 and under control of electro-magnetically operated valve mechanism comprising a pair of opposed solenoid coils 51 in the valve cylinder 12, the core of each coil being operatively connected to opposite ends of a valve piston 52 having a port 53 therethrough and a longitudinal groove 53' in its inner upper circumferential portion so as to be in constant communication with the port 26 and movable in opposite directions to bring the outer end of the port 53 into inlet and exhaust positions, respectively. In the inlet position of the valve piston 52, the port 53 communicates with the pipe 28 and in the exhaust position thereof, said port communicates with an exhaust nipple 54 in the cylinder 12.

The solenoids 51 are energized, to move said pistons 52 to inlet and exhaust positions, respectively, by connection to the automobile battery 7 and under control of pairs of inlet and exhaust switches 56 and 57, respectively, one pair for each jack, and located on the instrument panel 55 of the automobile. The inlet switches 56 are connected on one side to the battery 7 by means of conductors 58, 59, 60 and 61, respectively. The other sides of said switches 56 are connected to the coils of the upper solenoids 51 by conductors 62, 63, 64 and 65, respectively, said solenoids being suitably grounded on the chassis frame 1 by means of wires 66, 67, 68 and 69, respectively. The exhaust switches 57 are connected on one side to the battery 7 by conductors 70, 71, 72 and 73, respectively, leading from said conductor 58 and on the other side to the coils of the lower solenoid of their related jacks by conductors 74, 75, 76, and 77, respectively, said lower solenoids being grounded on the chassis frame 1 by wires 78, 79, 80 and 81 respectively.

The operation and use of my invention, will, it is believed, be clear from the foregoing without further description. It may be stated, however, that the degree of pressure in the storage tank 27 may be varied by adjusting the threaded plug 44 in the control valve 30 to increase or diminish the compression of the spring 42, a nut 44' being provided on said plug for that purpose. Under different adjustments of said plug 44 the valve piston 41 will operate under different pressures in the tank 27 to cut off the engine 6 from said tank.

In Figure 2 there has been shown an inclined skid 82 for use in moving the car sideways out of cramped spaces, for instance, in parking. Said skid comprises a plank heavily oiled and greased on its upper face and secured at one end to a transverse block 83. By jacking the front wheels up, for instance as shown in Figure 2, placing such skids thereunder in the proper position and releasing the jacks the front end of the car may be readily shifted sideways to enable the driver to manipulate out of such spaces or similar situations.

The foregoing is a detailed description of a preferred embodiment of my invention but it is to be understood that right is herein reserved to changes and modifications of described details falling within the scope of the claims appended hereto.

What I claim is:

1. A fluid pressure operated jack of the character and for the purpose described, comprising an integral structural unit having provision for attachment to the body to be lifted and including a first elongated liquid containing cylinder and a second similarly elongated liquid containing cylinder disposed side by side in parallel relation to each other and intercommunicating at one end, a jack lift medium comprising a piston and piston rod reciprocably mounted in said first liquid containing cylinder with the rod projected through the end of the cylinder remote from its communicable end, said piston rod being provided at its outer end with a supporting foot, a piston reciprocably mounted in said second cylinder in opposed relation to said first mentioned piston, a body of non-compressible liquid trapped displaceably in said cylinders between the respective pistons thereof and of an amount whereby when one piston is at the end of its cylinder the other piston is at the opposite end of its cylinder, a spring element acting to move the piston of the first cylinder towards its communicable end portion and yieldably holding it retracted in that direction, a spring element acting to move the piston of the second cylinder away from its communicable end portion and yieldably holding it retracted in that direction, and selectively operable and controllable means for supplying fluid under pressure to said second cylinder at the side of the piston therein opposite to that working against the trapped liquid and for exhausting said pressure fluid from said second cylinder, at will.

2. A fluid pressure operated jack of the character and for the purpose described, comprising an integral structural unit having provision for attachment in vertical position to the axle of an automobile and including a pair of elongated liquid containing cylinders disposed in parallel side by side relation to each other, said cylinders intercommunicating at their upper ends, a jack lift medium comprising a piston and a piston rod reciprocably mounted in one of said cylinders and spring-pressed for movement upwardly therein, the piston rod extending through and beyond the lower end of the cylinder and having a supporting foot at its outer end, a piston reciprocably mounted in the companion cylinder and spring-pressed for movement downwardly therein, said pistons working in opposed relation to each other, a body of non-compressible liquid trapped displaceably in said cylinders between the respective pistons thereof and of such amount that when the first piston is in its upper position the second piston is in its lower position, said second mentioned piston having a depending reduced end extension limiting downward movement of the piston and providing an annular space between the bottom of said companion cylinder and the body portion of the piston when the piston is positioned at the lower end of the cylinder, and controllable means for supplying fluid under pressure to said annular space in the companion cylinder and exhausting said fluid therefrom, comprising a cylindrical valve casing secured laterally to the lower end portion of said companion cylinder and intercommunicating therewith through a port opening, a single slide valve member movable in said valve casing to inlet and exhaust positions, and selectively controlled electromagnetic means for moving said slide valve member to either of said positions, at will.

3. A fluid pressure operated jack of the character and for the purpose described, comprising an integral structural unit having provision for attachment in vertical position to the axle of an automobile and including a pair of elongated liquid containing cylinders disposed in parallel side by side relation to each other, said cylinders intercommunicating at their upper ends, a jack lift medium comprising a piston and a piston rod reciprocably mounted in one of said cylinders and spring-pressed for movement upwardly therein, the piston rod extending through and beyond the lower end of the cylinder and having a supporting foot at its outer end, a piston reciprocably mounted in the companion cylinder and spring-pressed for movement downwardly therein, a body of non-compressible liquid trapped displaceably in said cylinders between the respective pistons thereof in sufficient amount to constitute a liquid link to move one piston by and with the other and whereby when one piston is positioned at one end of its cylinder the other piston is positioned at the opposite end of its cylinder, and means for supplying fluid under pressure to said companion cylinder below the piston therein and exhausting said fluid therefrom, comprising a cylindrical valve casing secured laterally to the lower end portion of the companion cylinder and having port communication therewith, said casing having separate fluid inlet and exhaust ports, a reciprocatory valve member in said casing having a port therein in constant communication with the communicable port to said companion cylinder, said valve member being movable in opposite directions to bring its port alternately into communication with said inlet and exhaust ports of the casing, and selectively controllable electromagnetic means associated with said valve member for moving the latter in either direction, at will.

4. As an article of manufacture of the character described, a single piece casting comprising a pair of cylinders of substantially equal length disposed in parallel side by side relation, and a shorter cylinder laterally offset from one end portion of one of said pair of cylinders and parallel therewith, the cylinders of said pair intercommunicating at one end thereof, a piston in each cylinder of said pair, reactive means for urging said pistons toward the opposite ends of their respective cylinders, a body of noncompressible liquid trapped in said cylinders between said pistons and of such amount that the piston in one cylinder is at the end thereof opposite to the end of the other cylinder where its piston is positioned, one of said pistons having a reduced end extension whereby an annular space is provided between the opposed end of its cylinder and the enlarged part of the piston when the latter is positioned adjacent said cylinder end, said casting having a port therein establishing communication between said shorter cylinder and said annular space, and selectively operable and controlled valve means for supplying fluid under pressure to said shorter cylinder and controlling said port communication between said shorter cylinder and the adjoining cylinder.

FRANK S. ARMSTRONG.